United States Patent [19]
Brainard

[11] 3,815,922
[45] June 11, 1974

[54] GOLF SHOT MEASURING APPARATUS

[76] Inventor: Robert E. Brainard, 1970 Plaza Montez, San Jose, Calif. 95132

[22] Filed: Oct. 16, 1972

[21] Appl. No.: 297,611

[52] U.S. Cl. ............................ 273/184 B, 340/177 R
[51] Int. Cl. ............................................. A63b 69/36
[58] Field of Search .......... 273/184, 185, 200, 26 B, 273/183

[56] References Cited
UNITED STATES PATENTS

| | | | |
|---|---|---|---|
| 3,124,958 | 3/1964 | McDonnell | 273/184 B |
| 3,380,305 | 4/1968 | Charell | 273/26 B X |
| 3,601,408 | 8/1971 | Wright | 273/185 D |

*Primary Examiner*—George J. Marlo

[57] ABSTRACT

A simulated golf ball target is tethered to a generally vertically directed post. The golf ball target is struck by a normal golf stroke and the impacted ball swings in a circular arc around the tether post. The down range component of deflection or strain produced by the centrifugal force vector on the tether post is monitored as by strain gage or other sensor. The sensed deflection or strain signal is integrated to yield an output corresponding to the integral over 180° of arc. The integral is proportional to range and may be displayed on a readout to indicate the down range distance of the golf shot.

17 Claims, 5 Drawing Figures

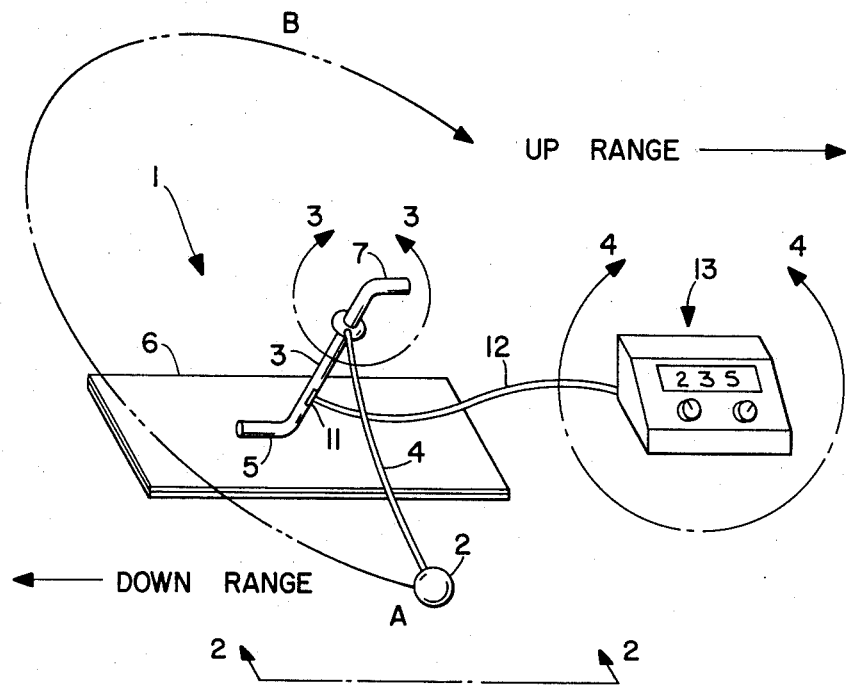
FIG. 1
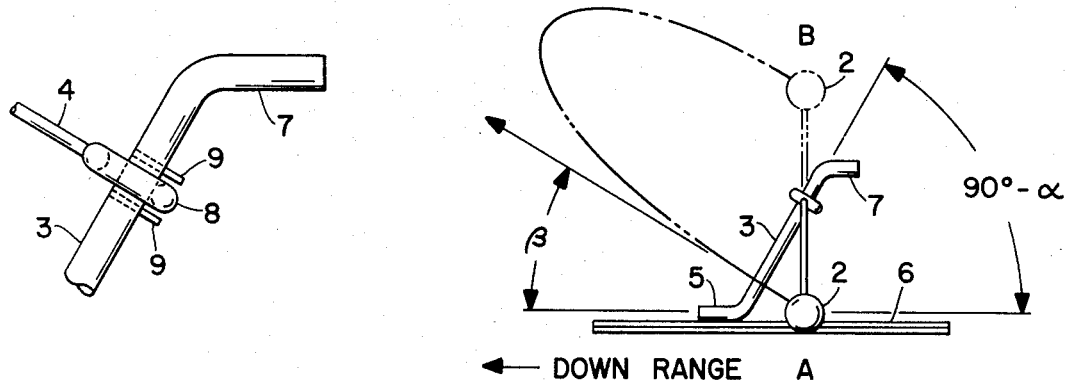
FIG. 3
FIG. 2

GOLF SHOT MEASURING APPARATUS

DESCRIPTION OF THE PRIOR ART

Heretofore, golf shot measuring devices have been proposed wherein the target ball was tethered to rotate about a vertical post. A disc was fixedly carried at the top of the post with a scale indicated about the periphery of the disc in yards. A star wheel was rotatably mounted to the disc and arranged such that the star wheel would engage a projection carried from the tether. As the ball was struck it was caused to circulate around the vertical post and disc. Upon each passage around the disc of the star wheel was incremented by one point. The total yardage of the golf shot was readout by adding the scale reading of the star wheel to the scale reading of the disc corresponding to the final position of the tether. Such a device is disclosed and claimed in a U.S. Pat.

One of the problems with this prior art golf stroke measuring device is that it would not be accurate for all clubs because the indicated response appears to be proportional to the horizontal component of impact velocity, which can be shown not to be proportional to distance as implied by the linear scale. Another difficulty with the prior art arrangement is that the accuracy is deleteriously affected by the tethered golf ball hitting the plane surface at least every revolution. In addition, the tether included a rigid arm member and the moment of inertia of the rigid arm and the remaining portion of the tether must be small with respect to the moment of inertia of the golf ball about the pivot axis so that the impact momentum can be effectively transferred to the mechanical indicating device. From the disclosure in the aforecited patent it would appear that the moment arm portion of the tether has a much higher moment of inertia than that of the golf ball. Therefore it is not expected that the device would be accurate.

SUMMARY OF THE PRESENT INVENTION

The principal object of the present invention is the provision of an improved golf shot measuring apparatus.

In one feature of the present invention, a golf stroke target, such as a light-weight golf ball is coupled to a generally vertically directed moment arm (tether post), such as a post attached to a base support structure. A sensor senses the down range component of strain or deflection of the moment arm (tether post) as the impacted target ball swings in an arc around the tether post. The sensed deflection or strain is integrated to derive an output proportional to the down range distance that a normal golf ball would have traveled had it been struck by the club head.

In another feature of the present invention, the tether moment arm or post is canted relative to the horizontal such that a normal projection of the tether post or moment arm onto the vertical down range plane makes a substantial angle α relative to the vertical, whereby the integral of the sensed down range component of deflection or strain which is perpendicular to the canted post is proportional to range that would have been achieved by a normal golf ball to a high degree of accuracy. Such component being readily sensed by the provision of a strain gage located either on the up range or down range side of the tether post.

In another feature of the present invention, the tether post is preferably canted at an angle of approximately 29° to the vertical to obtain a high degree of down range accuracy.

In another feature of the present invention, the tether post is vertical and deflection or strain sensors are disposed on the up range and down range sides of the tether post for sensing the up range and down range components of deflection or strain and means are included for taking the sum and difference of the sensed deflection or strain signals to derive an output proportional to the range that the normal golf ball would have traveled.

Other features and advantages of the present invention will become apparent upon a perusal of the following specification taken in connection with the accompanying drawings wherein:

BRIEF DESCRIPTION OF THE DRAWINGS

FIG. 1 is a perspective view of a golf shot measuring apparatus incorporating features of the present invention, FIG. 2 is a side elevational view of the structure of FIG. 1 taken along line 2—2 in the direction of the arrows, FIG. 3 is an enlarged detail view of a portion of the structure of FIG. 1 delineated by line 3—3.

DESCRIPTION OF THE PREFERRED EMBODIMENTS

Figure 4:
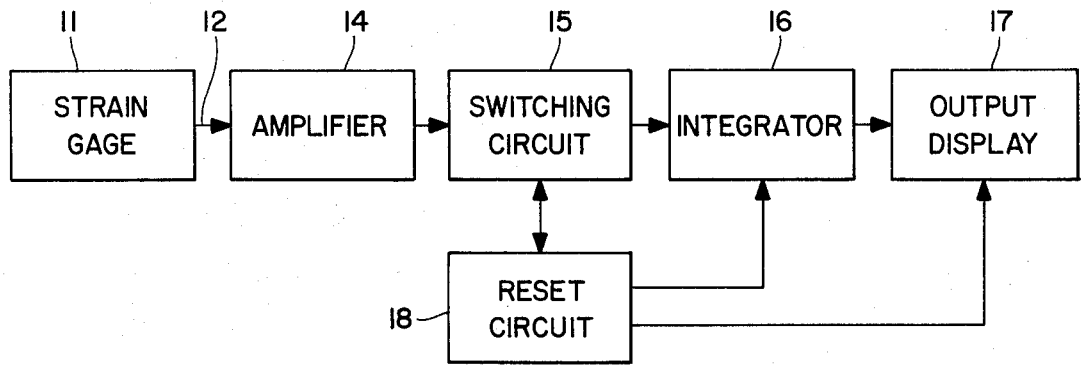
FIG. 4 is a schematic block diagram for the measuring circuit portion of the structure of FIG. 1 delineated by line 4—4.

Referring now to FIG. 1, there is shown the golf shot measuring apparatus 1 incorporating features of the present invention. More particularly, a target simulated golf ball 2 is tethered to a tether post (moment arm) 3 via the intermediary of a tethering line 4 such as a resilient yieldable line as of nylon rope or other similar material.

The tether post 3 is fixedly secured at a root end thereof at 5 to a base structure 6. The root portion of the tether post 3 may comprise a horizontally bent portion of a rod, as of three-eighths inch diameter steel, forming the tether post 3. The tether post may be secured to the base plate 6 as by any conventional securing means such as clamps, screws, bolts, welding or the like. The base structure 6 may comprise for example a 10 pound one-eighth inch thick steel plate having a suitable anti-skid material, such as sheet rubber, affixed to the underside of the plate 6. The base plate 6 is preferably disposed on a flat horizontal surface such as the ground, floor or the like. The upper end of the tether post 7 is preferably bent into the horizontal plane or, as an alternative, covered with a large round knob or the like to eliminate the hazard of a vertically directed post.

The tether line 4, as of 12 to 20 inches in length, is pivotably secured to the tether post 3 in a manner as more clearly shown in FIG. 3. More particularly, the tether line 4 is fixedly secured to a ring 8 having an inside diameter substantially larger than the outside diameter of the tether post 3 such that the tether line 4 and ring 8 are free to pivotably rotate about the tether post 3 while transmitting a centrifugal force to the tether post 3. The ring 8 is captured axially of the rod by suitable means such as by a pair of pins 9 passing through the tether post 3 and straddling the ring 8. In one example, the ring 8 may comprise a tubular ring with a terminating loop portion of the tether line being coaxially disposed within and looping around the interior of the tubular ring 8.

A strain gage 11 is mounted to the up range side of the tether post 3 near the point of attachment of the tether post 3 to the base 6. The electrical output of the strain gage 11 is fed via a cable 12 to an electronic measuring and display device 13.

Referring now to FIG. 4 there is shown, in block diagram form, the electronic circuitry within the electronic measuring and display device 13. The electrical output of the strain gage 11 is fed via cable 12 to an amplifier 14 wherein the signal is amplified and thence fed through a switching circuit 15 to an integrator 16 for integration thereof. The switching circuit 15 has means therein such as a Schmitt trigger for sensing a change in the sign of the detected strain gage signal as would occur when the target ball 2 attains positions A and B of FIG. 1, the zero and 180° positions in its tethered circular arc around the tether post 3.

The switching circuit starts the integration as the target ball is impacted at position A and starts its circular trajectory. Upon the ball reaching position B, the 180° position, the down range component of the centrifugal force, as detected by strain gage 11, changes sign. This change in sign is detected and the Schmitt trigger terminates the input to the integrator. In this manner the integrator integrates the down range component of strain transmitted to the strain gage over the first 180° of arc of the target ball around the tether post 3.

It turns out, as will be more fully described below, that this integral of the strain gage signal from zero to 180° is proportional to the down range distance a normal golf ball would have traveled had it been struck by the golf head instead of the target ball 2. The output of the integrator is fed to an output display 17, such as an analog-to-digital converter, feeding an output digital display, or analog display, not shown, to display a measure of the golf shot. A reset circuit 18, which may be manually or automatically actuated, resets the output display to zero, discharges the integrator 16, and resets the Schmitt trigger circuit within the switching network such that the golf shot measuring apparatus 1 is readied for measuring the next golf shot.

Figure 5:
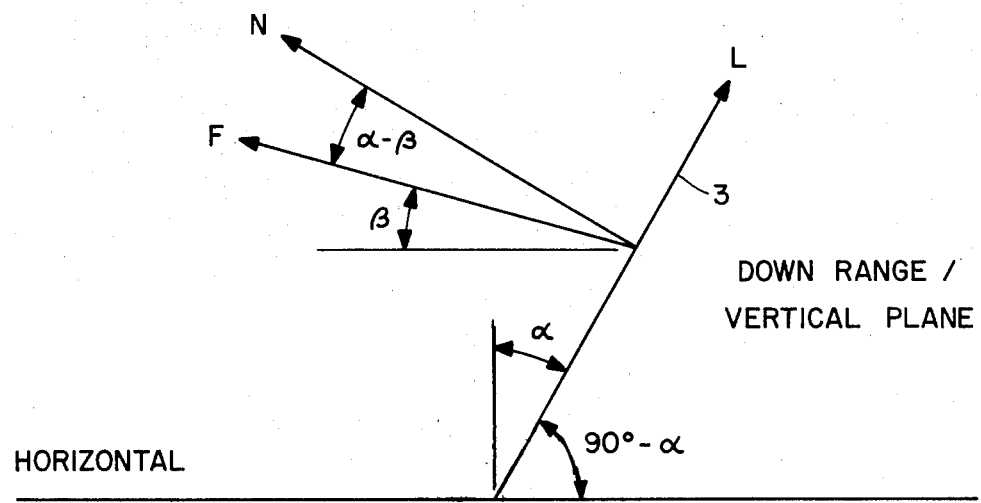
FIG. 5 is a vector diagram depicting various components of force exerted on the tether post in the apparatus of FIG. 1.

Referring now to FIGS. 2 and 5, it will be seen that the longitudinal axis of tether post 3 is canted at a substantial angle $\alpha$ to the vertical in the down range vertical plane. In the preferred embodiment, the longitudinal axis of the tether post 3 lies in the vertical down range plane. Upon being impacted the target ball 2 leaves the horizontal plane at an initial elevation angle $\alpha$. Thus, the centrifugal force vector F imparted to the canted tether post 3, having a longitudinal axis, can be resolved into two components, a first component L parallel to the longitudinal axis and a second component N normal to the longitudinal axis. The strain gage 11 is arranged at the up range side of the tether post 3, as shown, or the down range side, to sense the strain transmitted to the tether post 3. The sensed strain is caused by a combination of the normal component N and the longitudinal component L of the centrifugal force vector. The sensed combination is determined by the specific geometric properties of the tether post 3 and the location of the strain gage 11. This signal is integrated for 180° of travel to derive an output which, as shown below for an effective cant angle $\alpha$ of 29°, very closely approximates the actual down range distance that a normal golf ball would have traveled had it been struck in the same manner as the target ball 2.

The following is a mathematical analysis making reference to FIG. 5 proving that integration of the strain gage signal is proportional to a function of the impact velocity V and of impact elevation angle $\beta$. The following notation is used in FIG. 5 and in the mathematical equations below which describe the relationship between the ball motion and the integrated strain gage signal.

Notation:

$S(t)$ strain measured by strain gage.

$K_i$ proportional constants which are functions of tether post geometry and mechanical properties, strain gage gain, golf ball mass, tether length, etc. $i = 1, 2, 3, 4$.

$t$ time of ball motion where ball impact occurs at $t = 0$.

F centrifugal force in the tether line.

$F(t)$ centrifugal force component of F contained in the vertical/down range plane.

P point of attachment of the tether line to the tether post.

$N(t)$ component of $F(t)$ normal to the tether post, applied at point P and contained in the down range plane.

$L(t)$ component of $F(t)$ parallel to the tether post.

$m$ golf ball mass.

V constant golf ball velocity equal to initial impact velocity.

R tether radius.

$w$ angular rate of the tethered ball about point P measured in the plane of motion.

$\alpha$ cant angle.

$\beta$ impact elevation angle.

The strain gage 11 measures the strain in the tether post 3 caused by the motion of the golf ball 2 in its circular path where $K_1$ and $K_2$ are constants based on the mechanical properties of the tether post 3. Equation 1 shows that the measured strain is proportional to the normal and longitudinal components of the centrifugal force $F(t)$ contained in the vertical/down range plane. This relationship is dependent on the fixed location of the strain gage behind the tether post.

$$S(t) = K_1 N(t) + K_2 L(t) \tag{1}$$

The motion of the golf ball 2 in its circular path causes a centrifugal force F to act on the tether post at point P since $$F = mV^2/R \tag{2}$$

The location of the strain gage on the tether post causes the gage to measure only the effect of the down range component of the centrifugal force $F(t)$ as follows:

$$F(t) = mV^2/R \sin w\, t \tag{3}$$

Where w is the angular rate of the tethered ball about the tether post during time $t$.

The centrifugal force component of equation 3 can then be resolved into normal and longitudinal components as a function of the tether post cant angle and the impact elevation angle as follows:

$$N(t) = F(t) \cos (\alpha - \beta) \quad (4)$$

$$L(t) = F(t) \sin (\alpha - \beta) \quad (5)$$

combining equations 1, 3, 4, 5, we have:

$$S(t) = mV^2/R \ (K_1 \cos (\alpha - \beta) + K_2 \sin (\alpha - \beta)) \sin w\ t \quad (6)$$

Expanding equation 6 and combining constant terms we have:

$$S(t) = V^2/2R \ (K_3 \sin \beta + K_4 \cos \beta) \sin w\ t \quad (7)$$

where $$K_3 = 2m \ (K_1 \sin \alpha - K_2 \cos \alpha) \quad (8)$$

$$K_4 = 2m \ (K_1 \cos \alpha + K_2 \sin \alpha) \quad (9)$$

Integrating equation 7 with respect to $t$ from 0 to $\pi$ we have:

$$\int_0^\pi S(t)dt = \frac{V^2}{w}(K_3 \sin \beta + K_4 \cos \beta) \quad (10)$$

since $$w = \frac{V}{R} \quad (11)$$

we then have $$\int_0^\pi S(t)dt = V(K_3 \sin \beta + K_4 \cos \beta) \quad (12)$$

Thus, the integral of the strain gage signal is proportional to initial impact velocity times a function of impact elevation angle. Both impact velocity and impact elevation angle affect the distance of a golf shot as shown by Table I. When the tether post is canted to an effective angle of approximately 29°, and with the appropriate loop gain, the nominal relationship between distance, impact elevation angle and velocity for normal golf shot performance of Table II can be achieved. Table II shows that the indicated range from equation 12 agrees within 2 percent of the required range when a reasonable allowance is made for roll after impact for low elevation shots. With additional improvements such as other embodiments described below, progressively more accurate response can be achieved at the expense of increased complexity. The data of Table I and II was obtained from a computer simulation of golf ball motion which included the effects of aerodynamic drag.

TABLE I

GOLF BALL DISTANCE TO IMPACT, YARDS

| Impact Elevation Angle, Deg. | Impact Velocity, FPS | | | | |
|---|---|---|---|---|---|
| | 150 | 200 | 250 | 300 | 350 |
| 10 | | 89.4 | 155.2 | 199.9 | 243.2 |
| 13 | | 104.3 | 183.9 | 233.0 | 279.3 |
| 20 | | 128.2 | 232.1 | 286.0 | |
| 27 | 103.6 | 141.8 | 261.0 | 315.9 | |
| 35 | 110.9 | 148.8 | 277.0 | | |
| 39 | 112.2 | 149.6 | 279.6 | | |

TABLE II

NOMINAL GOLF BALL DISTANCE

| Nominal Impact Elevation Angle | Required Impact Velocity FPS* | Desired Range Yard | Indicated Range Yards | % Error |
|---|---|---|---|---|
| 10 | 333.8 | 240 | 242.1 | +0.9 |
| 13 | 314.0 | 230 | 231.1 | +0.5 |
| 16 | 299.3 | 220 | 222.1 | +1.0 |
| 19 | 276.6 | 210 | 207.4 | −1.2 |
| 20 | 263.7 | 200 | 198.3 | −0.8 |
| 23 | 242.6 | 185 | 183.7 | −0.9 |
| 27 | 223.2 | 170 | 169.9 | −0.1 |
| 31 | 207.0 | 155 | 157.5 | +1.6 |
| 35 | 194.5 | 145 | 147.3 | +1.6 |
| 39 | 179.6 | 135 | 134.7 | −0.2 |
| 43 | 160.3 | 120 | 118.4 | −1.3 |
| 47 | 149.4 | 110 | 108.2 | −1.6 |
| 55 | 131.8 | 90 | 90.2 | +0.2 |

*includes roll after impact for low elevation angle shots

In an alternative embodiment, the longitudinal axis of the tether post 3 is also canted out of the vertical down range plane toward the user, such that the plane of the trajectory of the target golf ball 2 is more nearly perpendicular to the longitudinal axis of the tether post 3. Tilting the tether post out of the vertical plane has the advantage that it allows functioning over a wide range of deviations from the nominal ball striking conditions resulting in a small improvement in accuracy of the down range readout and allowing less vertical clearance between the base 6 and the point of attachment of the tether line 4 to the tether post 3. However, the normal projection of the canted tether post 3 into the vertical down range plane preferably has a substantial cant angle $\alpha$, such projected angle $\alpha$ preferably being 29°.

In another alternative embodiment, the strain gage 11 is replaced by other devices such as capacitive, magnetic, inductive or resistive devices for measuring deflection of the tether post 3. An electrical output proportional to the down range component of deflection which is normal to the longitudinal axis of the tether post is an electrical signal equivalent to the strain gage output and may be fed directly to the amplifier 14 in place of the strain gage output to derive a measure of distance.

In an alternative embodiment, the canted tether post 3 is replaced by a vertical tether post with a pair of strain gages with one of the devices placed on the down range side of the tether post 3 and the other sensor placed on the up range side of the tether post. The sum of the two output signals from the two sensors is a measure of the strain of deflection caused by the longitudinal stress in the vertical tether post 3. Such stress is in the vertical tether post 3. Such a sum output is obtained by feeding the two outputs to an adder, not shown. The difference of the two signals is proportional to the moment caused by the force normal to the vertical tether post and obtained by feeding the two outputs to a subtractor, not shown. The outputs of the two strain gages are combined to provide an equivalent measure of the desired centrifugal force vector. As shown by equation (1), above, an equivalent strain gage signal is formed by such a composite of the normal and longitudinal components. This signal may be integrated in the manner as indicated in equation (12), which is shown to be proportional to initial impact velocity times a function of impact elevation angle. Both impact velocity and impact elevation angle affect the distance of a golf shot as shown in Table I.

In an alternative display and signal processing embodiment of the present invention, a data storage and processing device, not shown, is added to the electronic assembly 13. The golfer presets the desired distance he wants to obtain from a particular golf shot. The output then displays the missed distance or the difference between the desired range and the actual range achieved. Alternatively, the golfer presets the distance of a hole. The measured distance output obtained in the output of integrator 16 and output 17 is subtracted from the distance of the hole with each successive golf shot until the distance to the hole is less than some desired value.

In an alternative embodiment, a strain gage or similar means is mounted on a sensitive structural element such as the tether post 3 which may be canted or uncanted to measure the time interval for the tethered golf ball 2 to rotate a predetermined angular distance such as 180° in the plane of motion. For the case of 180° rotation, the strain gage signal would appear as a half wave sine function. A differentiator circuit, not shown, detects the change in polarity occurring for a phase angle of zero and 180°. The time between differentiated pulses is inversely proportional to velocity and to distance. A pair of strain gages affixed to the tether post 3 are utilized to measure the impact elevation angle $\beta$. The ratio of the strains are related to impact elevation angle $\beta$. The signals are processed according to the algorithms of equations (1) through (12) to provide an accurate measure of distance.

Although the tether post 3 has been shown as rigidly mounted to the base 6 without means for adjusting its position, additional accuracy can be obtained by providing means for adjusting the cant angle of the post 3 relative to the base 6. In addition, additional accuracy can be obtained by adjusting the scale factor of the integrator 16, as by an adjustable potentiometer or capacitor. The physical adjusting mechanisms that may be utilized for increased accuracy would include, an adjustable mechanism at the juncture of the post 3 with the base plate 6 for adjusting the cant angle. In an alternative embodiment, the length between the tether ring 8 and the base 6 is adjustable. Other adjustments can be made that include rotation of the base 6 relative to the golfer's line of direction and rotation of the initial impact point relative to the forward direction of the mechanical assembly.

Rotation of the base relative to the golfer's line of direction and rotation of the initial impact point relative to the forward direction can be accomplished by the golfer to change the initial location of the tethered golf ball for different clubs.

The advantage of the present invention is that by the use of relatively simple devices an accurate measure of golf shot down range distance is obtainable. The device is portable and relatively inexpensive compared to prior computerized golf range devices offering similar accuracy.

What is claimed is:
1. In a golf shot measuring apparatus,
moment arm means;
means for holding said moment arm at a point of attachment with a substantial longitudinal component of said moment arm means being directed out of the horizontal;
golf stroke target means to be struck by the club head as swung by a golfer;
coupling means for coupling said golf stroke target to said moment arm and for coupling forces imparted to said target upon being struck by said club head into said moment arm;
sensor means for sensing the deflection or strain of said moment arm to derive an output proportional thereto; and
means for integrating said output to derive a second output proportional to the down range distance a normal golf ball would have traveled if it had been stroked instead of the target.

2. The apparatus of claim 1 wherein said moment arm means comprises a post directed out of the horizontal and canted such that a normal projection of said post onto the vertical down range plane makes a substantial cant angle $\alpha$ to the vertical.

3. The apparatus of claim 2 wherein said cant angle $\alpha$ is within the range of 20° to 50°.

4. The apparatus of claim 2 wherein said cant angle $\alpha$ is approximately 29°.

5. The apparatus of claim 2 wherein said coupling means comprises a tether line means for tethering said target to said post, and pivot means for pivotably coupling said tether line means to said post, whereby said impacted target is constrained to a trajectory which swings around said post in a circular arc.

6. The apparatus of claim 5 wherein said sensor means is coupled to said post for sensing the down range component of deflection or strain imparted to said post.

7. The apparatus of claim 6 wherein said sensor means is coupled to said post for sensing the down range component of centrifugal force exerted on said post.

8. The apparatus of claim 6 wherein said cant angle $\alpha$ is within the range of 20° to 50°.

9. The apparatus of claim 6 including, means for controlling said integrator means for integrating the output of said sensing means for approximately only the time between reversals of the sign of the output of said sensor means.

10. The apparatus of claim 9 wherein said cant angle $\alpha$ is approximately 29°.

11. The apparatus of claim 6 wherein said sensor means senses strain in said post and is disposed proximate the point of attachment of said post to said holding means.

12. The apparatus of claim 1 wherein said coupling means comprises a tether line pivotably coupled to said moment arm.

13. The apparatus of claim 1 wherein said sensor means comprises a strain sensing means coupled to said moment arm for sensing the strain in said moment arm means.

14. The apparatus of claim 1 including, means for controlling the operating cycle of said integrator means for integrating the output of said sensing means for approximately the time between reversals of the sign of said sensor output.

15. The apparatus of claim 1 wherein said sensor means is coupled to said moment arm means to sense the down range deflection or strain imparted to said moment arm.

16. The apparatus of claim 15 wherein said sensor means includes a pair of said sensor means, one of said sensors being disposed on the down range side of said moment arm means and the second sensor disposed on the up range side of said moment arm means.

17. The apparatus of claim 16 including, means for deriving sum and difference outputs of the said first and second sensor means.

* * * * *